United States Patent [19]
Doggrell et al.

[11] Patent Number: 6,106,390
[45] Date of Patent: Aug. 22, 2000

[54] DEHUSKING APPARATUS

[75] Inventors: Lincoln Munro Doggrell, Bundaberg; David William Anderson, Gin Gin; Melville Francis Barsby, Bundaberg, all of Australia

[73] Assignee: Macadamia Management Bundaberg Pty. Ltd., Queensland, Australia

[21] Appl. No.: 09/192,773

[22] Filed: Nov. 16, 1998

[30] Foreign Application Priority Data

Nov. 19, 1997 [AU] Australia ................................ 45315/97

[51] Int. Cl.[7] ...................................................... A01D 46/00
[52] U.S. Cl. .............................. 460/141; 56/103; 241/7; 241/74; 241/260.1
[58] Field of Search ................................ 56/328.1, 340.1, 56/DIG. 2, 103; 460/45, 46, 110, 141, 142, 114, 80, 81, 83, 71, 63, 69, 66, 75; 241/7, 74, 260.1

[56] References Cited

U.S. PATENT DOCUMENTS

| | | | |
|---|---|---|---|
| 1,155,155 | 9/1915 | Kienzle | 460/46 |
| 1,770,792 | 7/1930 | Lizamore | 460/46 |
| 2,870,594 | 1/1959 | Larsh | 56/328 |
| 3,463,406 | 8/1969 | Musgrave | 241/86 |
| 3,817,256 | 6/1974 | Buchele et al. | 130/6 |
| 4,023,478 | 5/1977 | Shaw | 99/628 |
| 5,190,160 | 3/1993 | Murphy et al. | 209/270 |
| 5,427,573 | 6/1995 | Rutt et al. | 460/142 |
| 5,919,086 | 7/1999 | Derry | 460/80 |

FOREIGN PATENT DOCUMENTS

| | | |
|---|---|---|
| 201069 | 3/1956 | Australia . |
| 673008 | 10/1993 | Australia . |
| 1104240 | 2/1968 | United Kingdom . |
| PCT/AU92/00339 | 7/1992 | WIPO . |

*Primary Examiner*—Thomas B. Will
*Assistant Examiner*—Nathan Mammen
*Attorney, Agent, or Firm*—Iandiorio & Teska

[57] ABSTRACT

A dehusking apparatus is provided having a fixed cage like housing and a conveyor within the housing for transporting produce from an inlet to an outlet. The conveyor has helical flights with an intermediate portion being covered by a flexible covering between which and the inside of the cage the produce may travel to be dehusked as the produce is conveyed through the apparatus.

18 Claims, 5 Drawing Sheets

DEHUSKING APPARATUS

BACKGROUND OF THE INVENTION

THIS INVENTION relates to a dehusking apparatus. In particular, the invention concerns an apparatus for dehusking macadamia nuts.

The invention will be described by way of example with reference to an apparatus for dehusking macadamia nuts. It should be appreciated that this description in relation to macadamia nuts is by example only, and that the apparatus of the invention may also be used for removing the husk, shell, casing, skin, peel or the like from other produce.

Australian patent specification 22762/92 discloses an apparatus for removing the covering from produce. The apparatus has an auger for conveying nuts through it and past spring biased pivotal toothed arms which engage the nuts and tear the husk from the nut. The husk so removed falls through a gap between a side plate and the auger, while the dehusked nuts are ejected by the auger and collected in a bin at one end of the auger.

The maximum size of produce that can be accommodated by this apparatus depends upon the degree to which the arms may move away from the auger. The apparatus does not function effectively if fed with produce of differing size. Larger produce tends to shepherd the smaller produce through the apparatus. This known apparatus has a large number of moving parts, is noisy in use, does not effectively separate husks and trash from the produce and is easily jammed. The drive parts of this apparatus cannot readily be reversed to clear blockages and generally disassembly and re-assembly is the only effective way in which a blockage may be cleared.

This known apparatus does not have a sufficiently high throughput and the presence of foreign objects tends to cause jamming of the apparatus.

SUMMARY OF THE INVENTION

It is an object of the present invention to provide a dehusking apparatus which at least minimises the disadvantages referred to above.

According to one aspect, the invention provides a dehusking apparatus having a housing including a plurality of circumferentially spaced longitudinally extending husk removing members, an inlet for produce adjacent one end of the housing, an outlet for produce spaced from the inlet, at least one retaining ring extending around the members and located between ends of the housing for inhibiting movement of the members, a conveyer within the housing and mounted for rotation relative to the housing, the conveyor having an inlet conveyor portion having at least a part helical flight, an outlet conveyor portion having at least a part helical flight and an intermediate conveyor portion having a plurality of helical flights and a flexible covering extending along the intermediate portion.

The husk removing members are preferably bars extending along the length of the housing and have spaces between them to allow unwanted material to exit from the housing. Preferably, the bars have a square transverse cross sectional shape, although other shapes are not excluded. Where the bars are square in transverse cross sectional shape, sides of the square shape extend tangentially relative to a circle about which the bars are located. The bars are fixed and unable to move either towards or away from the conveyor within the housing.

The conveyor may have a shaft from which the helical flights of the inlet, intermediate and outlet portions extend.

The inlet portion of the conveyor, as mentioned, has at least a part helical flight which acts as an inlet auger for conveying the produce from the inlet into the apparatus to the intermediate conveyor portion. Preferably, the inlet conveyor portion has one complete helical auger flight. The pitch of the inlet auger flight is at least equal to or less than the pitch of the pitch of the helical flights of the intermediate conveyor portion.

The intermediate conveyor portion preferably includes open helical flights providing a helical rim extending between the inlet and outlet helical portions. However, the intermediate portion may nevertheless include complete helical flights extending from an outer edge of the conveyor to the shaft rather than open flights which just provide a helical rim spaced outwardly from the shaft.

Where the intermediate conveyor portion includes open helical flights, a plurality of supports may extend between the helical rim presented by such an open flight and the shaft extending along the conveyor. The supports may consist of support posts extending radially outwardly of the shaft and between the shaft and the helical rim. By having an open flight supported by posts, any produce which inadvertently enter the space between the helical rim and the shaft may be ejected by rotating the conveyor in a direction opposite to the direction which conveys produce from the inlet to the outlet. As an alternative to rotation in a reverse direction the apparatus may be inclined with the inlet lower than the outlet and this allows for automatic clearing of the space between the helical rim and the shaft.

The flexible covering may consist of one or more strips of flexible material having an end secured to an upstream end of the shaft and an opposite end secured to a downstream end of the shaft with edges of the strip located adjacent a free edge of the helical flights where the intermediate portion has complete helical flights or adjacent or inside the rim provided by open helical flights. Where the covering consists of two or more flexible strips, these strips may be secured end to end. If desired, a plurality of biasing members may extend between the shaft and the covering. Preferably, the biasing members consist of coil springs although biasing may be achieved in any other suitable way.

The outlet conveyor portion, as mentioned, may include at least a part of a helical flight forming an auger. The pitch of the helical auger in the outlet conveyor portion is at least equal to the pitch of the intermediate conveyor portion. The helical flights of the portions of the conveyor preferably all have the same amplitude.

According to another aspect of the invention, there is provided a retaining ring for use in the dehusking apparatus, the ring having attachment portions to which husk removing members may be secured, the attachment portions being circumferentially spaced from one another and located around an inner periphery of the ring, the attachment portions being spaced from one another by a clearance passage.

BRIEF DESCRIPTION OF THE DRAWINGS

A particular preferred embodiment of the invention will now be described by way of example with reference to the drawings in which.

DETAILED DESCRIPTION OF THE PREFERRED EMBODIMENT

Figure 1:
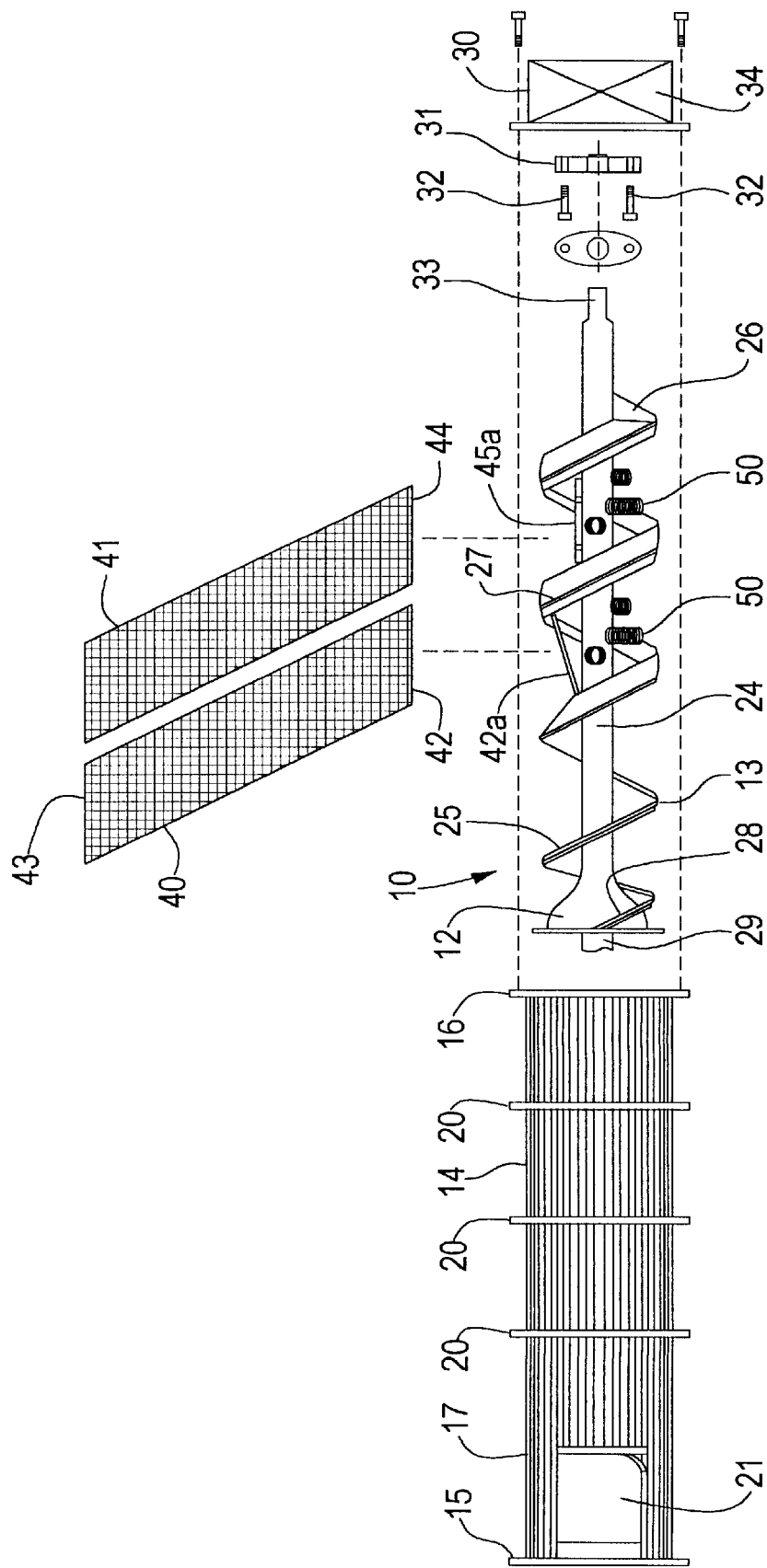
FIG. 1 shows an exploded view of a dehusking apparatus according to an embodiment of the invention.

FIG. 1 shows an exploded view of a dehusking apparatus 10. The apparatus has a drive motor (not shown) coupled to one end 12 of a conveyor 13. The apparatus has a cage 14 having two end plates 15, 16 between which extend a plurality of circumferentially spaced bars 17. Retaining rings 20 extend around the bars and are located at spaced locations along the bars 17. An inlet opening 21 allows produce to be introduced into the apparatus.

The conveyor 13 has a shaft 24, an inlet conveyor portion 25 consisting of at least one helical flight of an auger secured to the shaft. An outlet conveyor portion 26 consisting of part of a helical flight of an auger is located at an end of the shaft opposite to portion 25.

An intermediate conveyor portion 27 which consists of open helical flights forming a helical band spaced from the shaft 24 extends between the inlet and the outlet conveyor portions.

The conveyor 13 has a substantially conical inlet portion 28 at end 12 into which the output shaft 29 locates to drive the conveyor. End housing 30 receives a bearing 31 held to it by fasteners 32. End 33 is received by the bearing 31. Housing 30 is coupled to end plate 16 and has an outlet 34 from which dehusked produce may exit the apparatus.

Resilient member 40 and 41 form a resilient sleeve or covering around conveyor portion 27. End 42 is fixed to mounting 42a and extends along the shaft 24 and end 43 is fixed to end 44 whilst end 45 is fixed to mounting 45a and extends along a trailing end of the shaft 24. Mounting 42a consists of a bar which extends along the shaft 24 and between adjacent flights of intermediate portion 27. Mounting 45a consists of a bar secured to and extending along the shaft 24. The longitudinal edges of members 40 and 41 extend adjacent the helical band formed by the conveyor portion 27 and locate inwardly of an edge of the portion. With such a sleeve configuration, produce introduced through the inlet 21 is first conveyed by conveyor portion 25 and then the resilient sleeve directs the produce between the sleeve and the inside of the cage or housing formed by the bars 17. Rotation of the conveyor 13 causes the produce to be advanced from the intermediate portion to the outlet portion 26 of the conveyor. The resilient sleeve biases the produce against the bars 17 to remove husks from them. Trash and other material passes through the bars and the dehusked produce is conveyed to the outlet 34.

The sleeve formed by resilient members 40 and 41 is biased towards the bars 17 by springs 50 which extend outwardly from the shaft.

Figure 2:
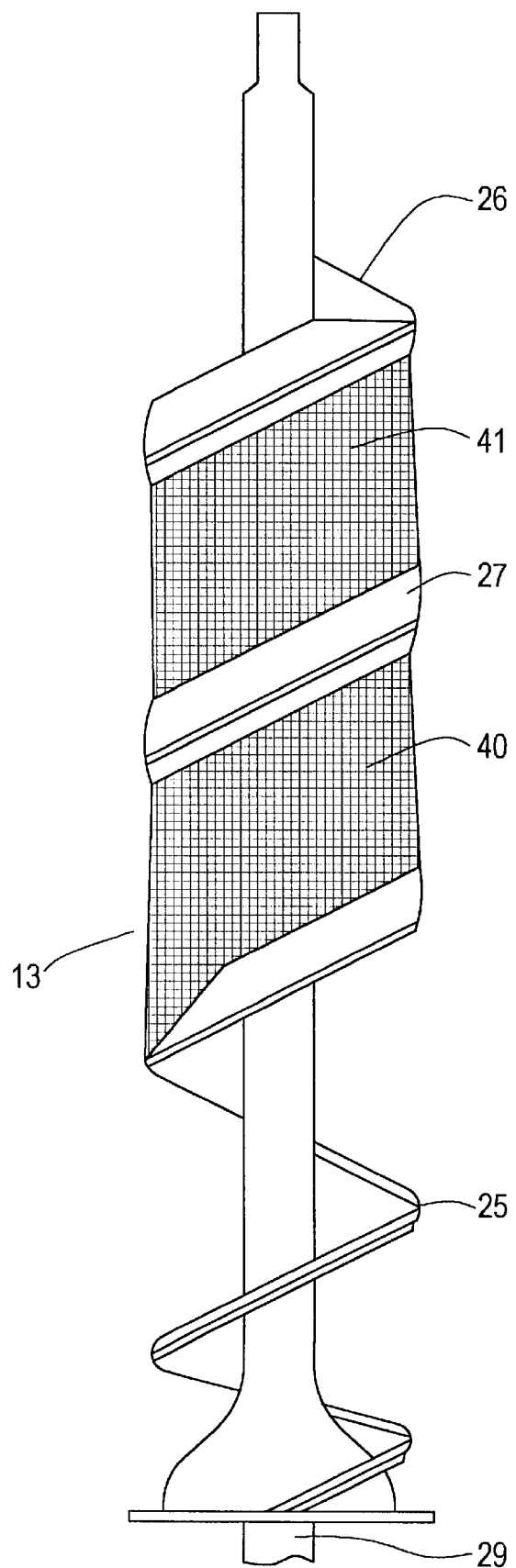
FIG. 2 is a plan view of an assembled conveyor which forms part of the apparatus of the invention.

FIG. 2 of the drawings shows an assembled conveyor 13 with the resilient members 40, 41 forming a sleeve around the intermediate portion 27 of the conveyor. The members 40, 41 are shown having a patterned outer surface. The members 40, 41 may be made from any suitable material but preferably are made from rubber.

Figure 3:
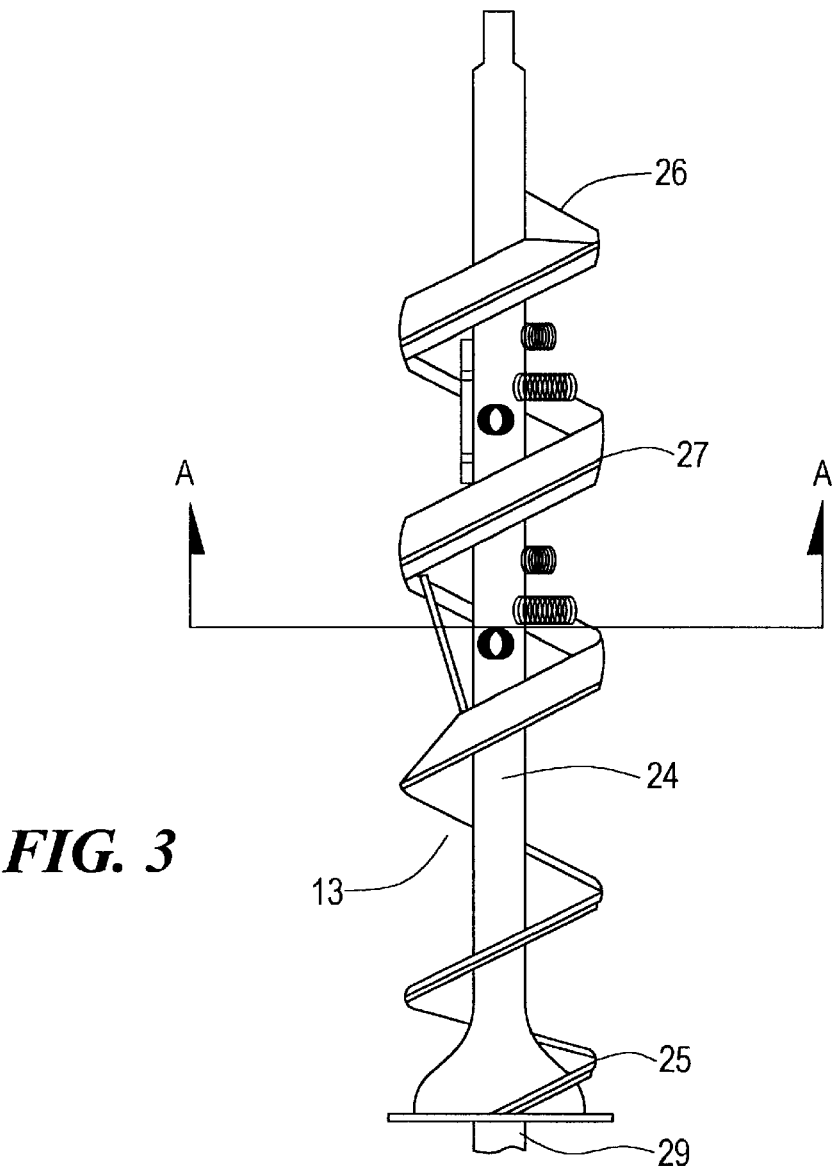
FIG. 3 is a further view of part of a conveyor.
Figure 4:
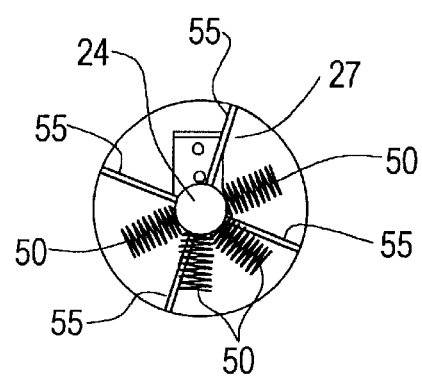
FIG. 4 is a sectional view of the conveyor of FIG. 3 taken along line A—A of FIG. 3.

FIGS. 3 and 4 show that the intermediate conveyor portion 27 consist of a helical bead or band is spaced from the shaft 24 by radially extending support posts 55.

Figure 5:
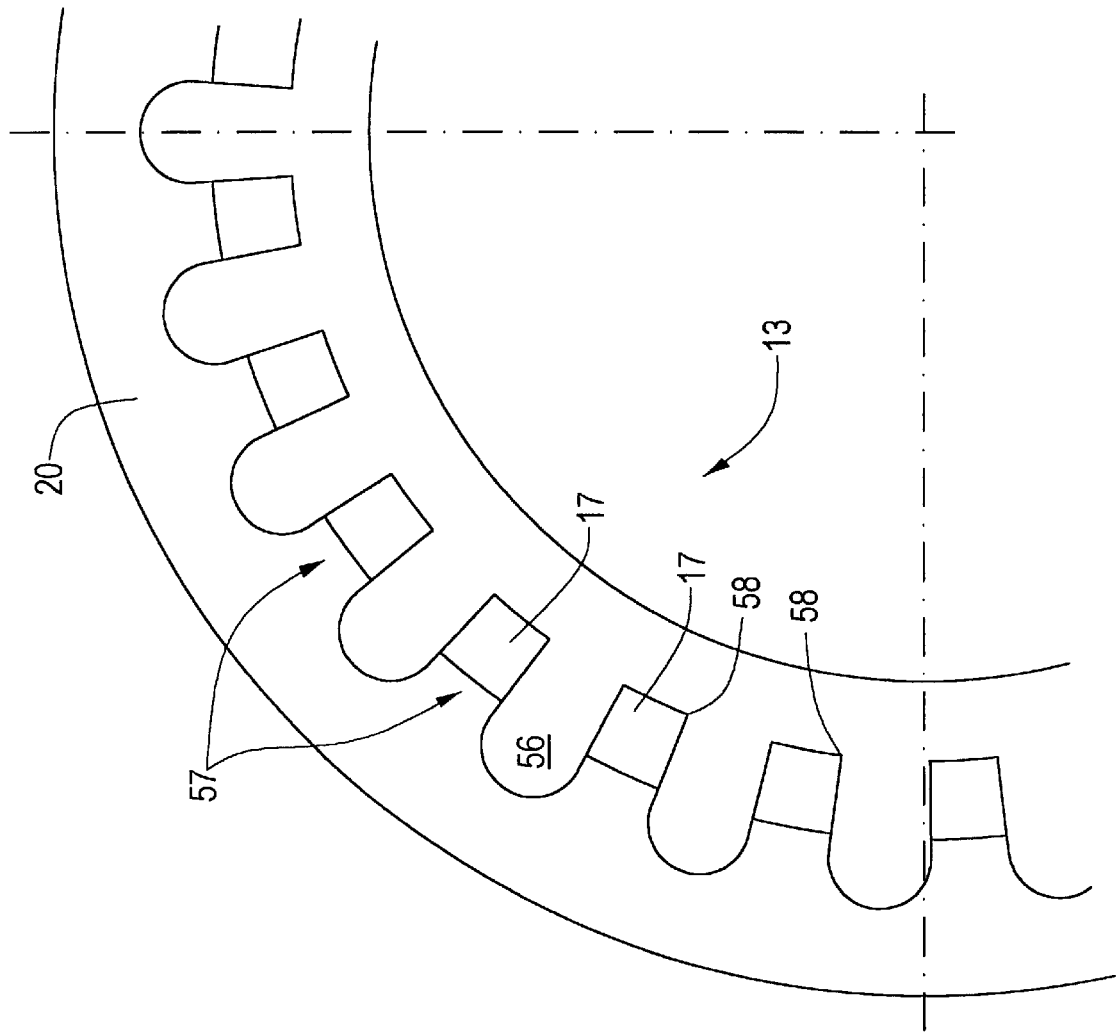
FIG. 5 is an elevational view of part of a retaining ring which forms part of the invention.

FIG. 5 shows detail of rings 20. The bars 17 are secured to the attachment portions 57 on the rings 20 and a scalloped portion 56 extends between adjacent bars 17 to provide clearance passage between the bars through which unwanted material may pass. The distance between corners 58 of two adjacent bars 17 is less than the maximum width of portion 56 and this allows trash to easily exit from the apparatus. The rings have a minimal width so that they do not unduly impede the exit of trash.

Figure 6:
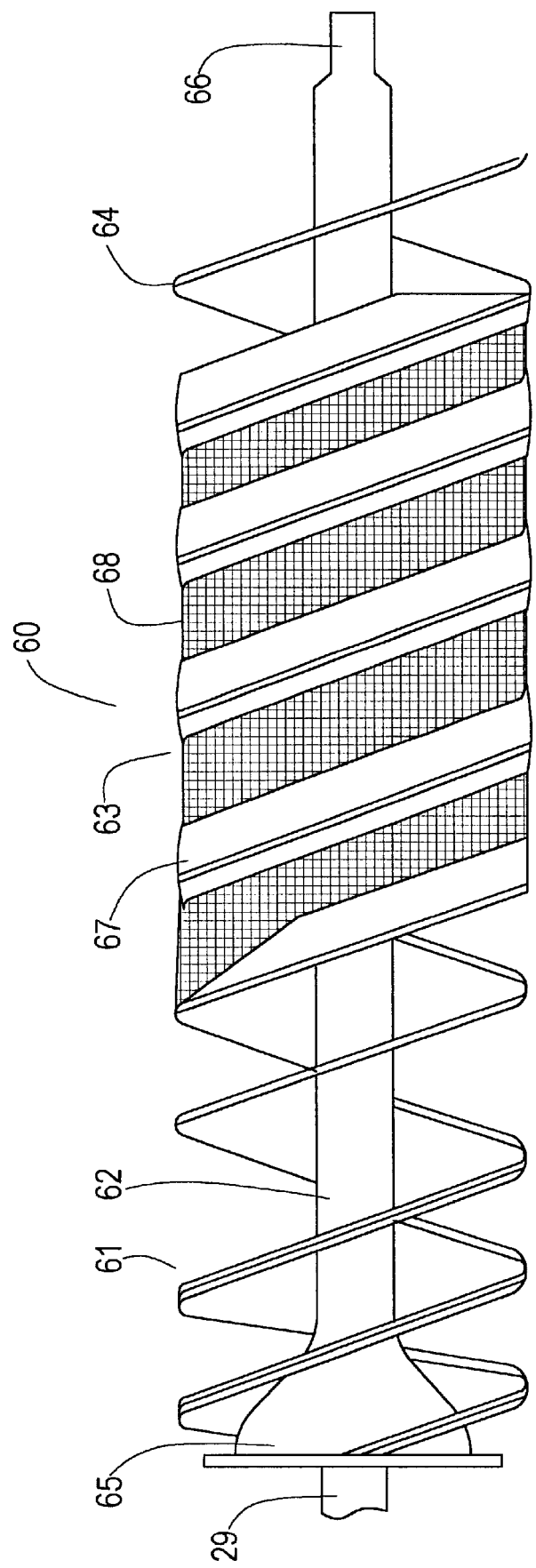
FIG. 6 shows a view of a conveyor according to another embodiment of the invention.

FIG. 6 shows a conveyor 60 which may be used as an alternative to conveyor 13 of FIG. 2. The conveyor 60 has an inlet portion 61 which consists of helical flights extending about a shaft 62, an intermediate portion 63 and an outlet portion 64. The shaft 62 has a enlarged portion 65 at its inlet end and a reduced portion 66 at its outlet end. The intermediate portion 63 consists of helical flights 67 which retain resilient member 68 in position. Member 68 may be provided by one continuous strip or several strips jointed end to end. Free ends of the member 68 may be fixed in place in the same manner as that described with reference to FIG. 1.

The helical flights along the conveyor may be present as multi-start auger portions. In this way, the apparatus may provide for the transport of a plurality of streams of produce through the apparatus.

The apparatus may be operated whilst inclined with the inlet being lower than the outlet. In this way, the apparatus not only dehusks produce, but also functions to elevate the produce. This may be advantageous in some circumstances.

The throughput of the apparatus may easily increase by increasing the speed at which the conveyor is rotated. The flexible sleeve extending over the intermediate conveyor portion readily deflects to allow the apparatus to dehusk produce of varying size and since the flexible material is not secured to the helical auger flights in the intermediate portion, any overloading of the apparatus results in the flexible material allowing the produce to enter the space between the helical band and the shaft. Any produce which enters this space and may flow back towards the inlet for reprocessing when the apparatus is inclined.

The dehusking action relies on a rolling action promoted by the flexible material and the produce is biased against the bars. A variety of materials may be employed to provide the flexible sleeve covering.

If desired, blockages may readily be cleared by rotating the conveyor in a reverse direction.

What is claimed is:

1. A dehusking apparatus having a housing including a plurality of circumferentially spaced longitudinally extending husk removing members, an inlet for produce adjacent one end of the housing, an outlet for produce spaced from the inlet, at least one retaining ring extending around the members and located between ends of the housing for inhibiting movement of the members, a conveyor within the housing and mounted for rotation relative to the housing, the conveyor having an inlet conveyor portion having at least a part helical flight, an outlet conveyor portion having at least a part helical flight and an intermediate conveyor portion having a plurality of helical flights wherein the conveyor includes a shaft from which the helical flights of the inlet conveyor portion, the outlet conveyor portion and the intermediate conveyor portions extend, and a flexible covering extending along the intermediate conveyor portions where the flexible covering includes a flexible strip having opposed ends secured to and extending along the shaft and having longitudinally extending edges adjacent a free edge of the helical flights of the intermediate conveyor portion.

2. The apparatus of claim 1, wherein the husk removing members are bars extending along the housing with the space between adjacent bars allowing unwanted material to exit from the housing.

3. The apparatus of claim 2, wherein the bars have a square transverse cross sectional shape with a side of the bar extending tangentially relative to a circle about which the bars are located.

4. The apparatus of any one of claims 1 to 3 including a plurality of said retaining rings being located at spaced locations along the length of the husk removing members.

5. The apparatus of claim 4 wherein the rings are evenly spaced along the length of the husk removing members.

6. The apparatus of claim 1 wherein the inlet conveyor portion includes one complete helical flight which acts as an auger for conveying produce from the inlet into the apparatus to the intermediate conveyor portion.

7. The apparatus of claims 6 wherein the pitch of the inlet auger flight is at least equal to or less than the pitch of the helical flights of the intermediate conveyor portion.

8. The apparatus of claim 1, wherein the part helical flight of the outlet conveyor portion has a pitch at least equal to or greater than the pitch of the helical flights of the intermediate conveyor portion.

9. The apparatus of claim 6, wherein the helical flights of the conveyor portions all have the same amplitude.

10. The apparatus of claim 1 wherein the intermediate conveyor portion has open helical flights providing a helical rim extending between the inlet and outlet conveyor portions.

11. The apparatus of claim 10 including a plurality of supports extending from the shaft to the helical rim.

12. The apparatus of claim 11 wherein the supports are present as support posts extending radially outwardly of the shaft and between the shaft and the helical rim.

13. The apparatus of claim 1 wherein the flexible strip comprises strip portions secured end to end.

14. The apparatus of claim 1 including biasing members extending between the shaft and the flexible covering.

15. The apparatus of claim 14 wherein the biasing members are coil springs.

16. The apparatus of claim 1 wherein said at least one retaining ring has attachment portions to which the circumferentially spaced longitudinally extending members may be secured, the attachment portions being circumferentially spaced from one another and located around an inner periphery of the ring, the attachment portions being spaced from one another by a clearance passage.

17. The apparatus of claim 16 wherein the members are welded to the attachment portions.

18. The apparatus of claim 16 wherein the clearance passage includes a radially innermost reduced width entry and a radially outermost clearance portion having a width greater than the entry.

* * * * *